United States Patent
Huang

(10) Patent No.: US 11,506,846 B2
(45) Date of Patent: Nov. 22, 2022

(54) GUIDE PIN AND MANUFACTURING METHOD THEREFOR

(71) Applicant: CHAOZHOU THREE-CIRCLE (GROUP) CO., LTD., Guangdong (CN)

(72) Inventor: Xueyun Huang, Guangdong (CN)

(73) Assignee: CHAOZHOU THREE-CIRCLE (GROUP) CO., LTD., Chaozhou (CN)

( * ) Notice: Subject to any disclaimer, the term of this patent is extended or adjusted under 35 U.S.C. 154(b) by 842 days.

(21) Appl. No.: 16/345,723

(22) PCT Filed: Jun. 19, 2017

(86) PCT No.: PCT/CN2017/088980
§ 371 (c)(1),
(2) Date: Apr. 28, 2019

(87) PCT Pub. No.: WO2018/082313
PCT Pub. Date: May 11, 2018

(65) Prior Publication Data

US 2020/0183096 A1    Jun. 11, 2020

(30) Foreign Application Priority Data

Nov. 4, 2016 (CN) .......................... 201610963978.7

(51) Int. Cl.
*F16B 13/00* (2006.01)
*G02B 6/38* (2006.01)
(Continued)

(52) U.S. Cl.
CPC ............ *G02B 6/3882* (2013.01); *C04B 35/48* (2013.01); *C04B 35/63492* (2013.01);
(Continued)

(58) Field of Classification Search
None
See application file for complete search history.

(56) References Cited

U.S. PATENT DOCUMENTS 6,702,479 B2 * 3/2004 Yang .................... G02B 6/3885
385/60
7,717,625 B2 * 5/2010 Margolin ............. G02B 6/3825
385/100

(Continued)

FOREIGN PATENT DOCUMENTS

CN         2793917 Y     7/2006
CN       102455466 A     5/2012
(Continued)

OTHER PUBLICATIONS

International Search Report of PCT Patent Application No. PCT/CN2017/088980 dated Sep. 27, 2017.

*Primary Examiner* — Ryan A Lepisto

(57) ABSTRACT

The present invention discloses a guide pin, which comprises a base support layer (1) and a protective layer (2). The base support layer (1) is a rod-shaped structure. The protective layer (2) tightly wraps the surface of the base support layer (1). A manufacturing method for the guide pin made of various materials is also disclosed. The guide pin manufactured by the method of the present invention is not prone to bending or deformation and has good corrosion resistance and acid/alkaline resistance properties; it is wear resistant and has of extended service life; it is easy to be processed and is low in cost.

8 Claims, 3 Drawing Sheets

(51) Int. Cl.
*C04B 35/48* (2006.01)
*C04B 35/634* (2006.01)
*C04B 103/61* (2006.01)
*F16B 19/02* (2006.01)
*C04B 35/119* (2006.01)
*C04B 35/486* (2006.01)
*C04B 35/488* (2006.01)

(52) U.S. Cl.
CPC ......... *G02B 6/3807* (2013.01); *G02B 6/3869* (2013.01); *G02B 6/3885* (2013.01); *C04B 35/119* (2013.01); *C04B 35/486* (2013.01); *C04B 35/4885* (2013.01); *C04B 35/63408* (2013.01); *C04B 35/63416* (2013.01); *C04B 35/63424* (2013.01); *C04B 35/63488* (2013.01); *C04B 2103/61* (2013.01); *C04B 2235/3201* (2013.01); *C04B 2235/3217* (2013.01); *C04B 2235/3225* (2013.01); *C04B 2235/3232* (2013.01); *C04B 2235/3244* (2013.01); *C04B 2235/3272* (2013.01); *C04B 2235/3418* (2013.01); *C04B 2235/6021* (2013.01); *C04B 2235/6022* (2013.01); *C04B 2235/612* (2013.01); *C04B 2235/72* (2013.01); *C04B 2235/725* (2013.01); *C04B 2235/94* (2013.01); *C04B 2235/945* (2013.01); *F16B 13/001* (2013.01); *F16B 19/02* (2013.01)

(56) References Cited

U.S. PATENT DOCUMENTS

| | | | | |
|---|---|---|---|---|
| 8,768,125 B2 * | 7/2014 | Beatty | ................ | G02B 6/3882 385/60 |
| 9,684,139 B2 * | 6/2017 | Chang | ................ | G02B 6/3825 |
| 10,162,126 B2 * | 12/2018 | Elenbaas | ............ | G02B 6/3874 |
| 10,215,926 B2 * | 2/2019 | Ott | ................ | G02B 6/3885 |
| 10,725,249 B2 * | 7/2020 | Higley | ................ | G02B 6/3882 |
| 2005/0069264 A1 * | 3/2005 | Luther | ................ | G02B 6/3821 385/59 |
| 2006/0013538 A1 * | 1/2006 | Hodge | ................ | G02B 6/3885 385/60 |
| 2015/0198773 A1 * | 7/2015 | Nakama | ............ | G02B 6/3885 385/79 |

FOREIGN PATENT DOCUMENTS

| | | |
|---|---|---|
| CN | 104111499 A | 10/2014 |
| CN | 105669191 A | 6/2016 |
| CN | 205450350 U | 8/2016 |
| JP | 2004004728 A * | 1/2004 |

* cited by examiner

GUIDE PIN AND MANUFACTURING METHOD THEREFOR

FIELD OF THE INVENTION

The invention relates to the field of optical fiber devices, in particular to a guide pin and a manufacturing method therefor.

BACKGROUND OF THE INVENTION

With the increasing capacities of modern communication systems, the demand for multi-core optical fiber connectors is increasing. The existing multi-core connectors mainly use MT-type optical fiber contacts as basic transmission units, and the optical connectors using a single MT-type optical fiber contact mainly include types of MTP, MPO, and MTRJ. The MPO optical fiber connector generally comprises a male head and a female head, the male head of the multi-core optical fiber connector is provided with a guide pin which is fixed to a guide pin base, and the female head has a limiting base at the tail end.

The existing guide pin is generally made of stainless steel and has an annular groove. The groove has a diameter of less than 0.3 mm. Too small a diameter results in a decrease in mechanical strength, so that the tail of the guide pin is easily bent, which affects docking precision. After the male and female heads are installed together, the guide pin can be easily rotated under the action of external force as the groove thereof is annular; as a result, a forced alignment effect between the guide pin and the guide hole is reduced. In addition, the guide pin made from stainless steel has poor corrosion resistance and wear resistance. Moreover, the guide pin made from stainless steel has high toughness, which leads to an increase in processing viscosity and increases processing difficulty.

SUMMARY OF THE INVENTION

Based on this, it is an objective of the invention to overcome the deficiencies of the prior art described above and to provide a guide pin that is not prone to bending, is resistant to corrosion and wear, is easy to be processed, and is more precise.

In order to achieve the above objective, the following technical solution is adopted by the invention: a guide pin that comprises a base support layer and a protective layer, the base support layer has a rod-shaped structure, and the protective layer tightly wraps the surface of the base support layer. It should be noted that the base support layer may either have a solid rod-like structure or a hollow rod-like structure, as long as it can satisfy the requirement that the guide pin should not be prone to bending.

As a further optimization of the above solution, two ends of the guide pin are a fixed end and an insertion end respectively, and the fixed end is provided with at least one groove.

It should be noted that there may be one or two grooves. When the number of grooves is two, the two grooves are symmetrically disposed on opposite sides of the fixed end, so that the guide pin can be better fixed to the guide pin base and is not easy to rotate. Alternatively, the number of grooves may be three. When the number of grooves is three, a triangle is formed by the three grooves, at this time, the guide pin is most stable. Alternatively, the number of grooves may be more, as long as the guide pin can be fixed to the guide pin base. Furthermore, the shape of the grooves can be annular, quadrangle, pentagon, or the like, or the shape of the grooves can be adjusted as needed. The grooves can be disposed on both sides or on the same side of the fixed end. The grooves on the same side of the fixed end are arranged in parallel.

As a further optimization of the above solution, the fixed end is provided with two grooves, and the two grooves are symmetrically disposed.

As a further optimization of the above solution, the insertion end of the guide pin is a cone frustum, the middle part of the guide pin is a rod-shaped main body, and the joint of the insertion end and the rod-shaped main body is provided with an arc chamfer. One end of the guide pin has an arc structure, therefore, when an MPO connector is being docked, wear at the guide hole of the guide pin can be reduced, and the number of times the guide pin can be inserted and removed can be increased. Alternatively, the insertion end is configured to be an arc surface. Alternatively, the insertion end is spherical.

As a further optimization of the above solution, the base support layer has a thickness of 0.0001 to 7 mm, and the protective layer has a thickness of 0.0001 to 7 mm. Through lots of experiments, the inventor has found that the guide pin has excellent wear resistance, corrosion resistance, and rigidity when the thickness ratio of the base support layer to the protective layer is 4 to 350:1.

As a further optimization of the above solution, the groove has a width of 0.0001 to 2 mm and a depth of 0.0001 to 7 mm. It should be noted that the length of the groove can be adjusted as needed, as long as it allows the guide pin to be fixed to the guide pin base.

As a further optimization of the above solution, the arc chamfer has an arc length of 0.001 to 7 mm.

As a further optimization of the above solution, the protective layer uniformly wraps the surface of the base support layer.

As a further optimization of the above solution, the material of the base support layer is a ceramic, a metal, or an LCP (liquid crystal polymer); the material of the protective layer is a ceramic, a metal, or an LCP. Preferably, the material of the base support layer is stainless steel; more preferably, the material of the protective layer is chromium, nickel or titanium.

In another aspect, the invention also provides a method for preparing the above-mentioned guide pin, comprising the following steps:

when the guide pin is made of a pure ceramic material, the method comprises consecutive steps of extrusion molding, cutting, outer diameter grinding, length grinding, chamfer grinding, outer diameter polishing, and grooving;

when both the base support layer and the protective layer of the guide pin are made of a pure ceramic material, a metal, an LCP, or a metal-doped ceramic material, the method comprises consecutive steps of injection molding and outer diameter polishing; and when the guide pin adopts a metal as the base support layer and a ceramic material as the protective layer, the method comprises the consecutive steps of injection molding, outer diameter polishing, and plating.

As a further optimization of the above solution, the cutting is performed by laser cutting, abrasive cutting, or water jet cutting; the outer diameter grinding is performed by grinding wheel grinding or grind ring grinding; the length grinding is performed by grinding wheel grinding or sandpaper grinding; the chamfer grinding is performed by grinding wheel grinding or brush grinding; the outer diameter polishing is performed by mechanical polishing, ultrasonic polishing, fluid polishing, magnetic abrasive polishing, chemical polishing, or electrolytic polishing; the grooving is performed by laser grooving, grinding wheel grooving, or water jet grooving; and the plating is performed by ion plating, vacuum evaporation, magnetron sputtering, or laser pulse deposition.

In a third aspect of the invention, the invention also provides a ceramic material, which is prepared from the following components: in mass percentages, 40 to 91% of hafnium oxide or/and zirconia oxide, 4 to 16% of yttrium oxide, 0 to 50% of alumina, 0 to 50 PPM of ferric oxide, 0 to 50 PPM of sodium oxide, 0 to 100 PPM of silicon dioxide, 0 to 50 PPM of titanium oxide, and 5 to 20% of a binder.

As a further optimization of the above solution, the binder is at least one selected from the group consisting of polyethylene, polypropylene, polyvinyl acetate, polymethyl methacrylate, polyethylene wax, paraffin, microcrystalline wax, beeswax, polyethylene glycol, and o-hydroxybenzoic acid.

In summary, the advantages according to the invention are as follows:

1. In terms of functional performance, the guide pin according to the invention is not prone to bending or deformation; it has good corrosion resistance and acid/alkaline resistance; it is wear-resistant and has a long service life;

2. In terms of processing performance, the guide pin according to the invention is easy to process, and can be processed through a plurality of processing methods; and 3. In terms of cost, the guide pin according to the invention is lower in cost.

Figure 1:
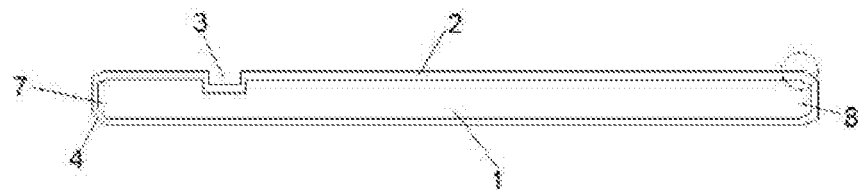
FIG. 1 is a schematic cross-sectional structural diagram of a guide pin according to an embodiment of the invention.

In the drawings, 1 represents a base support layer, 2 represents a protective layer, 3 represents a groove, 4 represents a cone frustum, 5 represents a first arc chamfer, 6 represents the rod-shaped main body, 7 represents the fixed end, 8 represents the insertion end, and 9 represents a second arc chamfer.

DETAILED DESCRIPTION OF PREFERRED EMBODIMENTS

The invention will be further described with reference to the accompanying drawings and specific embodiments in order to better illustrate the objectives, technical solutions, and advantages of the invention.

Example 1

Figure 3:
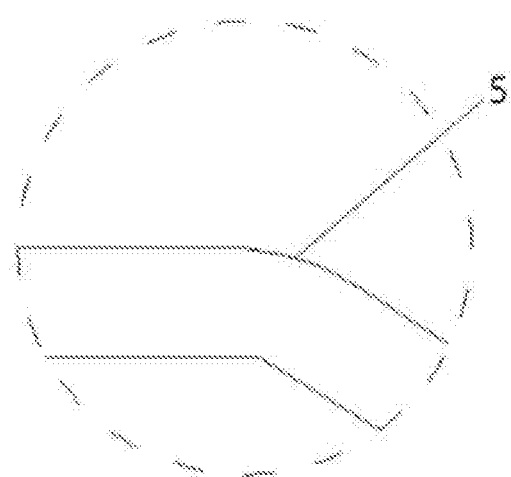
FIG. 3 is an enlarged schematic diagram showing a partial structure of FIG. 1 of the invention.

As shown in FIG. 1 and FIG. 3, the guide pin comprises a base support layer 1 and a protective layer 2, the base supporting layer 1 and the protective layer 2 form a two-layer concentric structure. The base support layer 1 has a rod-shaped structure with a certain length and diameter, and the protective layer 2 uniformly and tightly wraps the surface of the base support layer 1. The base support layer 1 has a thickness of 0.0001 mm, and the protective layer 2 has a thickness of 0.0001 mm. The protective layer is made of metal chromium, and the base support layer is made of stainless steel. The protective layer is a metal chrome coating so that the guide pin is more resistant to corrosion and wear.

Figure 5:
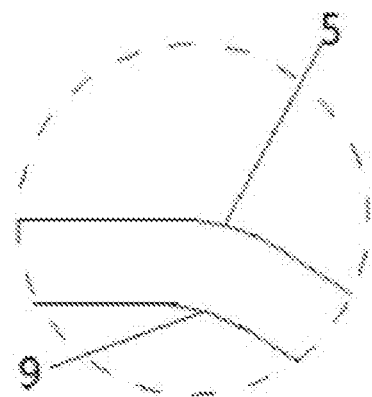
FIG. 5 is an enlarged schematic diagram showing a partial structure of a joint of an insertion end and a rod-shaped main body according to Example 1 of the invention.

Two ends of the guide pin are respectively a fixed end 7 and an insertion end 8. The insertion end 8 of the guide pin is a cone frustum, the middle part of the guide pin is a rod-shaped main body 6, and the joint of the insertion end 8 and the rod-shaped main body 6 is provided with a first arc chamfer 5. When an MPO connector is being docked, the first arc chamfer 5 of the guide pin can reduce wear at the guide hole and increase the number of times the guide pin can be inserted and removed. The fixed end is provided with a groove 3. It should be noted that the shape of the groove may be rectangular or other shapes, as long as it allows the guide pin to be fixed on the guide pin base. The groove has a width of 0.0001 mm and a depth of 0.0001 mm, and the first arc chamfer 5 has an arc length of 0.001 mm. In addition, as shown in FIG. 5, a second arc chamfer 9 is provided at a position corresponding to the first circular chamfer 5 of the base support layer 1 and the protective layer 2, which allows a closer attachment between the base support layer 1 and the protective layer 2.

The guide pin is prepared by the consecutive steps of injection molding, outer diameter polishing, and plating; wherein the outer diameter polishing can be performed by mechanical polishing, ultrasonic polishing, fluid polishing, magnetic abrasive polishing, chemical polishing, electrolytic polishing, or the like; the plating can be performed by ion plating, vacuum evaporation, magnetron sputtering, laser pulse deposition, or the like.

Example 2

As shown in FIG. 1 and FIG. 3, the guide pin comprises a base support layer 1 and a protective layer 2, the base supporting layer 1 and the protective layer 2 form a two-layer concentric structure. The base support layer 1 has a rod-shaped structure with a certain length and diameter, and the protective layer 2 uniformly and tightly wraps the surface of the base support layer 1. The base support layer 1 has a thickness of 0.5 mm, and the protective layer 2 has a thickness of 0.3 mm. The protective layer is made of a ceramic material, and the base support layer is made of a metal material. The ceramic material has high hardness, a certain brittleness, and stable performance; the guide pin comprising the ceramic material thus is not prone to bending, has good acid resistance, alkali resistance, and corrosion resistance, and is easy to be processed in various ways. Furthermore, the ceramic material is of lower cost than stainless steel materials.

Two ends of the guide pin are respectively a fixed end 7 and an insertion end 8. The insertion end 8 of the guide pin is a cone frustum, the middle part of the guide pin is a rod-shaped main body 6, and the joint of the insertion end 8 and the rod-shaped main body 6 is provided with a first arc chamfer 5. The fixed end is provided with a groove 3. It should be noted that the shape of the groove may be rectangular or other shapes, as long as it allows the guide pin to be fixed on the guide pin base. The groove 3 has a width of 0.1 mm and a depth of 0.2 mm, and the first arc chamfer 5 has an arc length of 0.5 mm.

The guide pin is prepared by the consecutive steps of injection molding, outer diameter polishing, and plating; wherein the outer diameter polishing can be performed by mechanical polishing, ultrasonic polishing, fluid polishing, magnetic abrasive polishing, chemical polishing, electrolytic polishing, or the like; the plating can be performed by ion plating, vacuum evaporation, magnetron sputtering, laser pulse deposition, or the like.

Example 3

As shown in FIG. 1 and FIG. 3, the guide pin comprises a base support layer 1 and a protective layer 2, the base supporting layer 1 and the protective layer 2 form a two-layer concentric structure. The base support layer 1 has a rod-shaped structure with a certain length and diameter, and the protective layer 2 uniformly and tightly wraps the surface of the base support layer 1. The base support layer 1 has a thickness of 1 mm, and the protective layer 2 has a thickness of 2 mm. The protective layer is made of metal nickel so that the guide pin is more resistant to corrosion and wear. The base support layer is made of a stainless steel material.

Two ends of the guide pin are respectively a fixed end 7 and an insertion end 8. The insertion end 8 of the guide pin is a cone frustum, the middle part of the guide pin is a rod-shaped main body 6, and the joint of the insertion end 8 and the rod-shaped main body 6 is provided with a first arc chamfer 5. The fixed end is provided with a groove 3. It should be noted that the shape of the groove may be rectangular or other shapes, as long as it allows the guide pin to be fixed to the guide pin base. The groove 3 has a width of 0.5 mm and a depth of 1 mm, and the first arc chamfer 5 has an arc length of 7 mm.

The guide pin is prepared by the consecutive steps of injection molding, outer diameter polishing, and plating; wherein the outer diameter polishing can be performed by mechanical polishing, ultrasonic polishing, fluid polishing, magnetic abrasive polishing, chemical polishing, electrolytic polishing, or the like; and the plating can be performed by ion plating, vacuum evaporation, magnetron sputtering, laser pulse deposition, or the like.

Example 4

Figure 2:
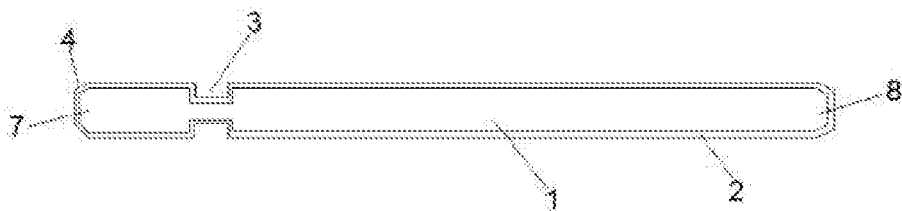
FIG. 2 is a schematic cross-sectional structural diagram of a guide pin according to another embodiment of the invention.

As shown in FIG. 2 and FIG. 3, the guide pin comprises a base support layer 1 and a protective layer 2, the base supporting layer 1 and the protective layer 2 form a two-layer concentric structure. The base support layer 1 has a rod-shaped structure with a certain length and diameter, and the protective layer 2 uniformly and tightly wraps the surface of the base support layer 1. The base support layer 1 has a thickness of 7 mm, and the protective layer 2 has a thickness of 7 mm. The protective layer is made of metal titanium, and the base support layer is made of stainless steel.

Two ends of the guide pin are respectively a fixed end 7 and an insertion end 8. The insertion end 8 of the guide pin is a cone frustum, the middle part of the guide pin is a rod-shaped main body 6, and the joint of the insertion end 8 and the rod-shaped main body 6 is provided with a first arc chamfer 5. The fixed end is provided with two grooves 3. The two grooves 3 have a certain depth and width, and they are disposed on opposite sides of the fixed end symmetrically so that the guide pin can be fixed to the guide pin base. The grooves have a width of 2 mm and a depth of 7 mm, and the first arc chamfer 5 has an arc length of 0.05 mm. It should be noted that the shape of the grooves may be rectangular or other shapes, as long as it allows the guide pin to be fixed to the guide pin base. When an MPO connector is being docked, the arc chamfer of the guide pin can reduce wear at the guide hole and increase the number of times the guide pin can be inserted and removed.

Figure 6:
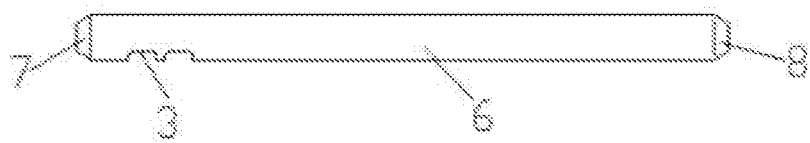
FIG. 6 is an example of a variation of a guide pin according to the invention.
Figure 7:
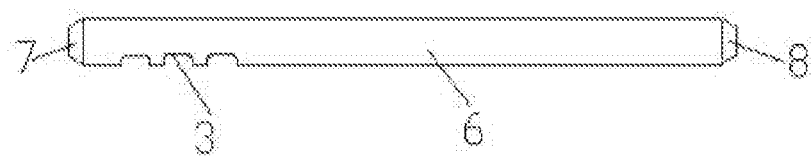
FIG. 7 is an example of another variation of a guide pin according to the invention.
Figure 8:
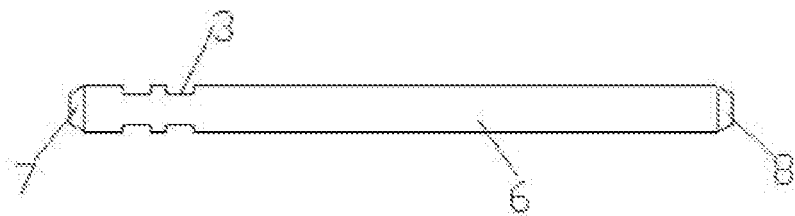
FIG. 8 is an example of yet another variation of a guide pin according to the invention.

As shown in FIG. 6, the two grooves 3 can also be located on the same side of the fixed end 7 and arranged in parallel. As shown in FIG. 7, the fixed end 7 can also be provided with three grooves 3, and the three grooves 3 are disposed on the same side of the fixed end and arranged in parallel. As shown in FIG. 8, the fixed end 7 can be provided with four grooves 3, the two opposite sides of the fixed end 7 are provided with two grooves 3 respectively, and the two grooves 3 on the same side are arranged in parallel.

The guide pin is prepared by the consecutive steps of injection molding, outer diameter polishing, and plating; wherein the outer diameter polishing can be performed by mechanical polishing, ultrasonic polishing, fluid polishing, magnetic abrasive polishing, chemical polishing, electrolytic polishing, or the like; the plating can be performed by ion plating, vacuum evaporation, magnetron sputtering, laser pulse deposition, or the like.

Example 5

As shown in FIG. 2 and FIG. 3, the guide pin comprises a base support layer 1 and a protective layer 2, the base supporting layer 1 and the protective layer 2 form a two-layer concentric structure. The base support layer 1 has a rod-shaped structure with a certain length and diameter, and the protective layer 2 uniformly and tightly wraps the surface of the base support layer 1. The base support layer 1 has a thickness of 0.06 mm, and the protective layer 2 has a thickness of 0.08 mm. The protective layer is made of a ceramic material, and the ceramic material has high hardness, a certain brittleness, and stable performance; the guide pin comprising the ceramic material is thus not prone to bending, has good acid resistance, alkali resistance and corrosion resistance, and is easy to be processed in various ways; furthermore, the ceramic material is of lower cost than stainless steel materials. The base support layer 1 is made of a metal; alternatively, the base support layer 1 is made of a stainless steel material.

Two ends of the guide pin are respectively a fixed end 7 and an insertion end 8. The insertion end 8 of the guide pin is a cone frustum, the middle part of the guide pin is a rod-shaped main body 6, and the joint of the insertion end 8 and the rod-shaped main body 6 is provided with a first arc chamfer 5. A groove 3 has a width of 0.03 mm and a depth of 0.04 mm, and the first arc chamfer 5 has an arc length of 2 mm. The fixed end is provided with two grooves 3. The two grooves 3 have a certain depth and width, and they are disposed on opposite sides of the fixed end symmetrically so that the guide pin can be fixed to the guide pin base. It should be noted that the shape of the grooves may be rectangular or other shapes, as long as it allows the guide pin to be fixed to the guide pin base. When an MPO connector is being docked, the arc chamfer of the guide pin can reduce wear at the guide hole and increase the number of times the guide pin can be inserted and removed.

The guide pin is prepared by the consecutive steps of injection molding, outer diameter polishing and plating; wherein the outer diameter polishing can be performed by mechanical polishing, ultrasonic polishing, fluid polishing, magnetic abrasive polishing, chemical polishing, electrolytic polishing, or the like; the plating can be performed by ion plating, vacuum evaporation, magnetron sputtering, laser pulse deposition, or the like.

Example 6

Figure 4:
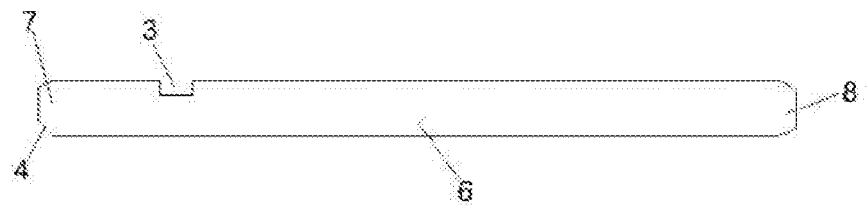
FIG. 4 is a schematic cross-sectional structural diagram of a guide pin of Examples 6 and 7 according to the invention.

As shown in FIG. 3 and FIG. 4, the guide pin comprises a rod-shaped main body 6 with a certain length and diameter. The base support layer and the protective layer are both made of a ceramic material. The base support layer has a thickness of 0.7 mm and the protective layer has a thickness of 0.002 mm. The ceramic material has high hardness, a certain brittleness, and stable performance, the guide pin comprising the ceramic material thus is not prone to bending, has good acid resistance, alkali resistance, and corrosion resistance, and is easy to be processed in various ways. Furthermore, the ceramic material is of lower cost than stainless steel materials.

Two ends of the guide pin are respectively a fixed end 7 and an insertion end 8. The insertion end 8 of the guide pin is a cone frustum, the middle part of the guide pin is a rod-shaped main body 6, and the joint of the insertion end 8 and the rod-shaped main body 6 is provided with a first arc chamfer 5. The fixed end is provided with a groove 3. The groove 3 has a width of 0.005 mm and a depth of 0.009 mm, and the first arc chamfer 5 has an arc length of 0.1 mm. It should be noted that the shape of the groove may be rectangular or other shapes, as long as it allows the guide pin to be fixed to the guide pin base. When an MPO connector is being docked, the arc chamfer of the guide pin can reduce wear at the guide hole and increase the number of times the guide pin can be inserted and removed.

The guide pin is prepared by the consecutive steps of extrusion molding, cutting, outer diameter grinding, length grinding, chamfer grinding, outer diameter polishing, and grooving; wherein the cutting can be performed by laser cutting, abrasive cutting, water jet cutting, or the like; the outer diameter grinding can be performed by grinding wheel grinding, grind ring grinding, or the like; the length grinding can be performed by grinding wheel grinding, sandpaper grinding, or the like; the chamfer grinding can be performed by grinding wheel grinding, brush grinding, or the like; the outer diameter polishing can be performed by mechanical polishing, ultrasonic polishing, fluid polishing, magnetic abrasive polishing, chemical polishing, electrolytic polishing, or the like; the grooving can be performed by laser grooving, grinding wheel grooving, water jet grooving, or the like.

Example 7

As shown in FIG. 3 and FIG. 4, the guide pin comprises a rod-shaped main body 6 with a certain length and diameter. The base support layer and the protective layer both are made of a ceramic material, a metal, an LCP, or a metal-doped ceramic material. The base support layer has a thickness of 2.8 mm and the protective layer has a thickness of 0.7 mm. The ceramic material has high hardness, a certain brittleness, and stable performance, the guide pin comprising the ceramic material thus is not prone to bending, has good acid resistance, alkali resistance, and corrosion resistance, and is easy to be processed in various ways. Furthermore, the ceramic material is of lower cost than stainless steel materials. An LCP (liquid crystal polymer) has excellent thermal stability, heat resistance, and chemical resistance. LCP has negligible creep characteristic which exists in most plastics, and has excellent wear resistance, excellent abrasion resistance, and outstanding corrosion resistance.

Two ends of the guide pin are respectively a fixed end 7 and an insertion end 8. The insertion end 8 of the guide pin is a cone frustum, the middle part of the guide pin is a rod-shaped main body 6, and the joint of the insertion end 8 and the rod-shaped main body 6 is provided with a first arc chamfer 5. The fixed end is provided with a groove 3. The groove 3 has a width of 0.28 mm and a depth of 0.6 mm, and the first arc chamfer 5 has an arc length of 0.9 mm. It should be noted that the shape of the groove may be rectangular or other shapes, as long as it allows the guide pin to be fixed to the guide pin base. When an MPO connector is being docked, the arc chamfer of the guide pin can reduce wear at the guide hole and increase the number of times the guide pin can be inserted and removed.

The guide pin is prepared by the consecutive steps of injection molding and outer diameter polishing; wherein the outer diameter polishing can be performed by mechanical polishing, ultrasonic polishing, fluid polishing, magnetic abrasive polishing, chemical polishing, electrolytic polishing, or the like.

Example 8

An example of the ceramic material according to the invention is prepared from the following components: in mass percentages, 40% of hafnium oxide, 16% of yttrium oxide, 50% of alumina, 50 PPM of ferric oxide, 20 PPM of sodium oxide, 100 PPM of silicon dioxide, 40 PPM of titanium oxide, and 5% of polyethylene.

The above ceramic material is prepared through the following steps: weighing the components according to the above ratio, then mixing the components in a mixer at 80° C. and 30 r/min for 180 min; and placing the mixed components in a screw extruder for extrusion and granulation at a temperature of 200° C. and a rotational speed of 180 rpm to obtain the ceramic material.

Example 9

An example of the ceramic material according to the invention is prepared from the following components: in mass percentages, 67% of hafnium oxide and zirconium oxide (the mass ratio of hafnium oxide to zirconium oxide being 3:1), 10% of yttrium oxide, 23% of alumina, 1 PPM of ferric oxide, 1 PPM of sodium oxide, 10 PPM of silicon dioxide, 0.5 PPM of titanium oxide, and 20% of polymethyl methacrylate.

The above ceramic material is prepared through the following steps: weighing the components according to the above ratio, then mixing the components in a mixer at 130° C. and 60 r/min for 95 min; and placing the mixed components in a screw extruder for extrusion and granulation at a temperature of 150° C. and a rotational speed of 340 rpm to obtain the ceramic material.

Example 10

An example of the ceramic material according to the invention is prepared from the following components: in mass percentages, 90% of hafnium oxide, 4% of yttrium oxide, 2% of alumina, 30 PPM of ferric oxide, 50 PPM of disodium oxide, 1 PPM of silicon dioxide, 50 PPM of titanium oxide, and 10% of a mixture of polyethylene and polyethylene glycol (the mass ratio of polyethylene to polyethylene glycol being 1:1).

The above ceramic material is prepared through the following steps: weighing the components according to the above ratio, then mixing the components in a mixer at 180° C. and 100 r/min for 30 min; and placing the mixed components in a screw extruder for extrusion and granulation at a temperature of 100° C. and a rotational speed of 500 rpm to obtain the ceramic material.

Example 11: Performance Test of the Ceramic Material of Example 9 According to the Invention (1) Hardness Test:

Vickers hardness (HV) of the surface: the ceramic material of Example 9 has an HV of 1200 or greater.

(2) Acid Resistance Test:

Test method: immerse the sample in hydrochloric acid with a concentration of 15% for 12 hours;

Test results: The ceramic material of Example 9 was not corroded; stainless steel reacted with the hydrochloric acid with a concentration of 15%.

(3) Alkali Resistance Test:

Test method: immerse the sample in a sodium hydroxide solution with a concentration of 15% for 12 hours;

Test results: the ceramic material of Example 9 was not corroded; the stainless steel did not react with the strong alkali solution at room temperature.

(4) Corrosion Resistance Test:

Test method: salt spray test;

Test instrument: YWX/Q-150 sprayer;

Test parameters: NaCl solution concentration: 5±0.5%; laboratory temperature: 35±2° C.; spray pressure: 0.12 MPa; saturated air barrel temperature: 46 to 48° C.; and spray method: continuous.

Test results: the stainless steel rusted after 48 hours of a continuous test, while the ceramic material of Example 9 did not rust after 48 hours of the continuous test.

Finally, it should be noted that the above embodiments are only intended to illustrate the technical solutions of the invention rather than to limit the scope of protection of the invention. Although the invention is described in detail with reference to the preferred embodiments, those ordinary skilled in the art should understand that the technical solutions of the invention may be modified or equivalently substituted without departing from the spirit and scope of the technical solutions of the invention.

What is claimed is:

1. A guide pin, wherein it comprises a base support layer and a protective layer, the base support layer has a rod-shaped structure, and the protective layer tightly wraps a surface of the base support layer, a thickness ratio of the base support layer to the protective layer is in a range from 4 to 350:1, two ends of the guide pin are a fixed end and an insertion end respectively and a middle part of the guide pin is a rod-shaped main body, the fixed end is provided with at least one groove, and the insertion end of the guide pin is a cone frustum, a joint of the insertion end and the rod-shaped main body is provided with a first arc chamfer, a second arc chamfer is provided at a position of the base support layer corresponding to the first arc chamfer of the base support layer and the protective layer.

2. The guide pin according to claim 1, wherein the fixed end is provided with two grooves, and the two grooves are symmetrically disposed.

3. The guide pin according to claim 2, wherein the groove has a width of 0.0001 to 2 mm, and a depth of 0.0001 to 7 mm.

4. The guide pin according to claim 1, wherein the groove has a width of 0.0001 to 2 mm and a depth of 0.0001 to 7 mm.

5. The guide pin according to claim 1, wherein the first arc chamfer has an arc length of 0.001 to 7 mm.

6. The guide pin according to claim 1, wherein the base support layer has a thickness of 0.0001 to 7 mm, and the protective layer has a thickness of 0.0001 to 7 mm.

7. The guide pin according to claim 1, wherein the protective layer uniformly wraps the surface of the base support layer.

8. The guide pin according to claim 1, wherein a material of the base support layer is a ceramic, a metal, or an LCP; and a material of the protective layer is a ceramic, a metal, or an LCP.

* * * * *